United States Patent [19]
Christie

[11] Patent Number: 6,111,725
[45] Date of Patent: Aug. 29, 2000

[54] TAPE CARTRIDGE HAVING A RETRACTABLE DOOR

[75] Inventor: Nicolai W. Christie, Oslo, Norway

[73] Assignee: Tandberg Data ASA, Oslo, Norway

[21] Appl. No.: 08/962,353

[22] Filed: Oct. 31, 1997

[51] Int. Cl.[7] .................................................. G11B 23/02
[52] U.S. Cl. .......................................... 360/132; 369/291
[58] Field of Search .................................... 360/132, 133; 369/291

[56] References Cited

U.S. PATENT DOCUMENTS

| | | | |
|---|---|---|---|
| 4,418,373 | 11/1983 | Fujimori et al. | 360/132 |
| 4,589,609 | 5/1986 | Oishi et al. | 360/132 X |
| 4,607,308 | 8/1986 | Tsuruta et al. | 360/132 |
| 4,680,660 | 7/1987 | Ueda | 360/132 |
| 4,701,822 | 10/1987 | Oishi et al. | 360/132 |
| 4,719,529 | 1/1988 | Oishi et al. | 360/132 |
| 4,797,768 | 1/1989 | Oishi et al. | 360/132 |
| 4,817,079 | 3/1989 | Covington | 369/291 |
| 5,407,145 | 4/1995 | Iwahashi | 242/347.1 |
| 5,408,459 | 4/1995 | Kawaguchi et al. | 369/77.2 |
| 5,422,775 | 6/1995 | Martin | 360/133 |
| 5,430,587 | 7/1995 | Engan | 360/96.5 |
| 5,453,896 | 9/1995 | Ohira | 360/132 |
| 5,497,279 | 3/1996 | Nishijima et al. | 360/96.5 |
| 5,503,348 | 4/1996 | Mizutani et al. | 242/347.1 |
| 5,556,051 | 9/1996 | Mizutani et al. | 242/347.1 |

FOREIGN PATENT DOCUMENTS

| | | |
|---|---|---|
| 63-234476 | 9/1988 | Japan . |
| 6-338163 | 12/1994 | Japan . |
| 7-105659 | 4/1995 | Japan . |
| 7-153226 | 6/1995 | Japan . |
| 7-169237 | 7/1995 | Japan . |

*Primary Examiner*—William Klimowicz
*Attorney, Agent, or Firm*—Hill & Simpson

[57] ABSTRACT

A pivotable door for a tape cartridge minimizes door opening space to be allocated within a tape drive and maximizes useable space within a tape cartridge closed by the door. The door may be an articulated two panel door having a top panel to be slid backward on a top cover of a cartridge with a lower panel which can be pivoted and drawn upwardly through arcuate channel guides to open a front and a top of the cartridge. A bottom panel can be slid into a retracted position on a bottom cover of the cartridge to expose a bottom opening of the cartridge. Alternatively, a one-piece pivotable door may be provided which is slid and pivoted along an axle on the top of the one-piece door on a top cover of the cartridge and guided by an arcuate edge guiding surface within the cartridge.

12 Claims, 3 Drawing Sheets

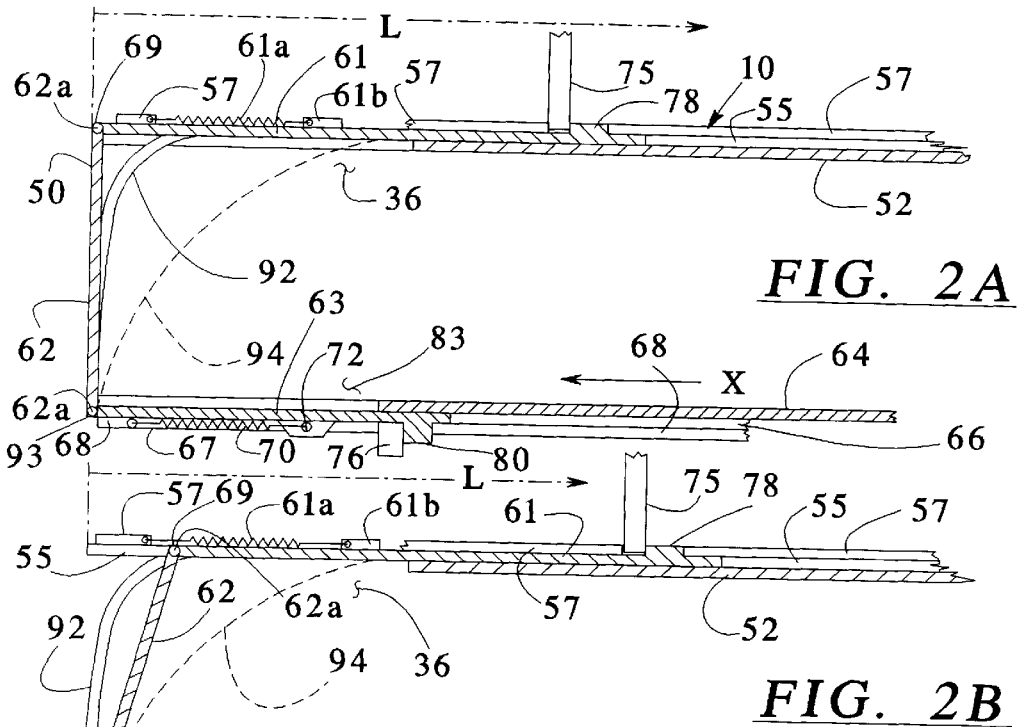
*FIG. 2A*
*FIG. 2B*
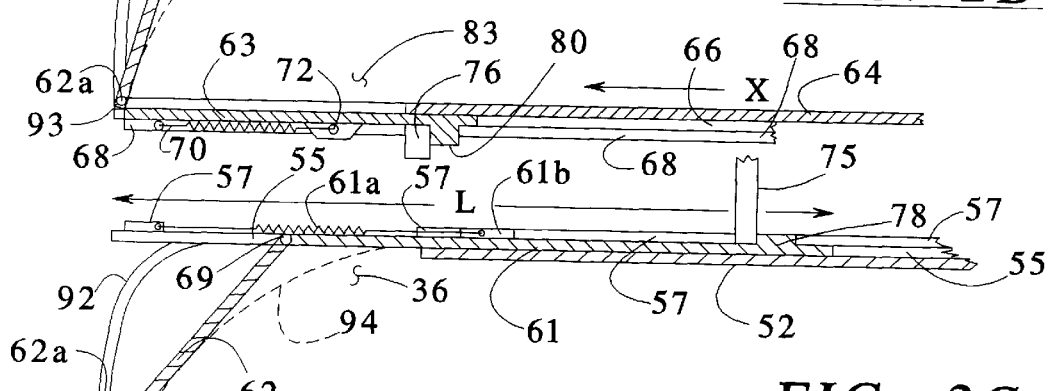
*FIG. 2C*
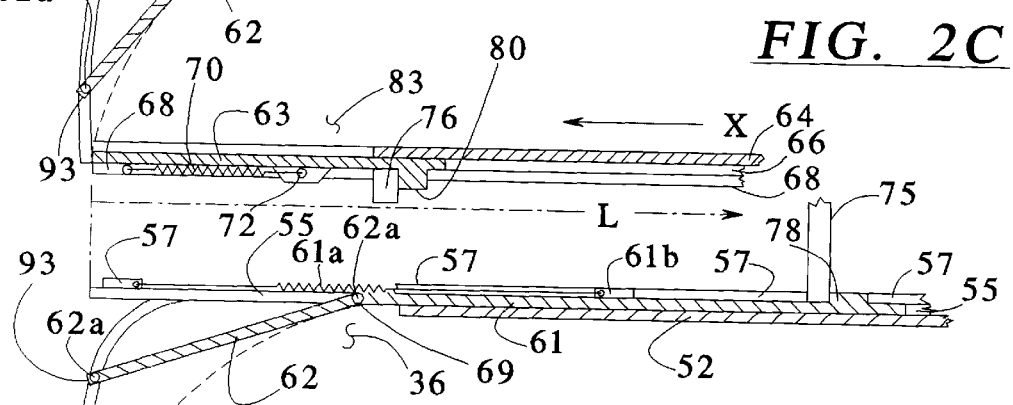
*FIG. 2D*
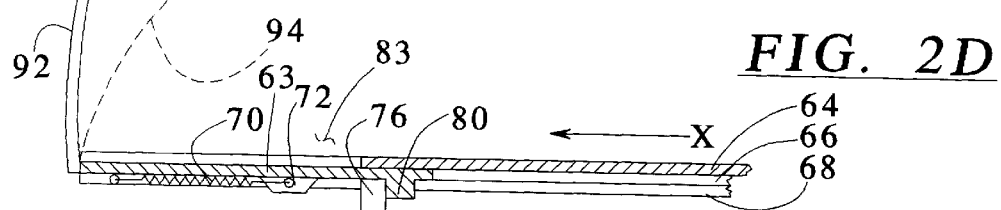

TAPE CARTRIDGE HAVING A RETRACTABLE DOOR

BACKGROUND OF THE INVENTION

The present invention relates to magnetic storage devices and particularly to a method and apparatus for enabling a compact design of a magnetic storage device, particularly for a tape cartridge.

Tape cartridges are in extensive use today having substantially replaced storage of tape on open reels. The compact-cassette or "Philips type" cassette provides an opening in the front of the cassette for allowing the magnetic head of the magnetic tape drive to access the tape within. A separate plastic cover is supplied with the cartridge for dust protection due to the permanent opening in front of the cartridge.

Modern data cassettes for use with computers, such as the ¼ inch data cartridge, incorporate an integral door so that the tape is protected when it is removed from the cassette protective case or dust cover. The door is hinged on one side of the cartridge, and the door is opened during loading of the cartridge into the recorder. Such cartridges and/or opening mechanism are disclosed, for example, in U.S. Pat. Nos. 4,622,606; 4,636,890; 4,984,111; and 5,323,280.

Door opening in data cassettes is typically accomplished in such a way that a part of a magnetic recorder pushes a small edge on an opposite side of the cassette door axis, causing it to pivot open. This design is useful for small openings, but for larger doors, this method generally requires excessive space and limits design flexibility for the mechanical design of the tape drive. Additionally, for small doors, a challenge is presented to accommodate the components of the magnetic tape drive in such a way that these components do not interfere with the opening of the door. This is especially true for tape drives where the cartridge is loaded into the tape drive sideways, that is, with a side of the cartridge perpendicular to the door leading the insertion of the cartridge into the tape drive.

Video cassettes also incorporate a door that protects the tape until the cartridge is inserted into the video tape recorder. Such a door is necessary due to a long span of tape located behind the door, which would otherwise be unprotected during the time period when the cartridge was removed from its protective dust cover until inserted into the video recorder. These cartridges must have the long span of tape on the front thereof due to the fact that the tape guiding mechanism is contained in the recorder, and that components of the guiding mechanism must be positioned behind the tape to withdraw the tape from the cartridge. Thus, access to the back of the tape is necessary so that the tape can be wrapped around a spinning video head drum.

During loading into the recorder, these cartridges are typically moved first inwardly and then downwardly for engagement with the hubs of the cartridge at the same time as the door is opened. The door opens in such a way that it is turned 90 degrees around an axis located near to the top cover. Thus, the door roughly follows a quarter of a full circle and ends in a position on the upper side of the cartridge. However, with the door in this position, the cartridge occupies an extra space compared to a cartridge with the door closed. Currently, the extra space for door opening is not of great concern in most videocassette drives since the extra space is available due to the above loading operation, particularly for the engagement movement with the tape hubs, i.e., the door opening space does not require additional space that is not otherwise needed for cassette loading. Such extra space requirement, however, may be a detriment in a drive which otherwise could more effectively use such wasteful extra space.

SUMMARY OF THE INVENTION

It is an object of the present invention to provide a magnetic storage device with an improved, compact design.

It is an object of the invention to provide a magnetic storage device having an openable door for closing an opening in the magnetic storage device and being openable for access to the magnetic storage medium within the device. The door provides an opening mechanism which reduces the overall space required for opening the door. It is an object of the present invention to provide a tape cartridge for a data storage device having an access opening on the front of the cartridge for engaging tape held within the cartridge by a magnetic head, and a door for closing the access opening when the tape is not in use for preventing contamination or abuse of the tape, wherein the door can be opened with a reduced space requirement within a tape drive.

An object of the present invention is achieved by providing a compact design of a tape cartridge which requires virtually no dedicated extra space for opening the door. An object is achieved by providing a door having a front portion which effectively rolls from a vertical closed orientation to a horizontal raised orientation to open an access opening for the tape. An object is achieved in that the door mechanism includes three spring-loaded sliding panels. During loading of the cartridge, the panels are opened in a direction that is opposite of the direction of movement of the cartridge. By this configuration, the door requires a minimum of mechanical parts for opening the access opening.

Two of the panels are hinged together. At each side of the door opening, a track or arcuate channel is formed into which a low end of the front panel is engaged, for example, by two small spindles. When the door is opened, the lower edge of the front panel travels along this track and, in this way, defines its position as the door opens. The track is shaped in such a way that the lowest edge of the front panel does not encroach into any positions which are outside the volume that is otherwise occupied by the cartridge when the door is closed. The doors are also guided in tracks that are molded in the upper and lower plastic covers of the cartridge. According to this embodiment, a certain space is required inside of the cartridge to allow for movement of the door so as not to protrude at all outside the cartridge volume.

A second embodiment balances the reduction in door operating space outside the cartridge with a reduction in door operating space within the cartridge. According to this embodiment, the door is permitted to protrude somewhat from the space occupied by the cartridge while it is being opened. This allocated door-opening space ahead of the cartridge, reduced from prior art designs, can be acceptable since there is usually some free room ahead of the cartridge when it is loaded. By allowing the door to protrude slightly from the cartridge space during opening, the space within the cartridge may be used more effectively. The movement of the door in this embodiment is not limited by a track, but by an arcuate edge onto which the door rests and slides. This edge defines the movement of the door while it is being opened and closed, the door sliding across the edge as it is drawn upward. Depending on the shape of the accurate edge, different parts of the door can be in contact with the edge from the point where it is closed until the point to where it is completely open.

The edge is positioned as high as possible in order to reduce the space within the cartridge that the door occupies.

However, the smaller the turning radius, the higher the load on the hinge of the door and the track that is needed to keep the cover in place. An advantageous design provides that the edge that defines the movement of the door is determined geometrically so that the distance between the hinge and the point where the door rests against the edge is constant. In another embodiment, points, such as spindles on an upper part of the door edge, follow the track or edge and thus define the movement of the door as it opens.

Additional features and advantages of the present invention are described in, and will be apparent from, the detailed description of the presently preferred embodiments and from the drawings.

BRIEF DESCRIPTION OF THE DRAWINGS

FIGS. 2A–2E are partial schematic longitudinal sectional views of the cartridge shown in FIG. 1, taken generally along the line II—II, showing progressively a door opening movement.

DETAILED DESCRIPTION OF THE PRESENTLY PREFERRED EMBODIMENTS

Figure 1:
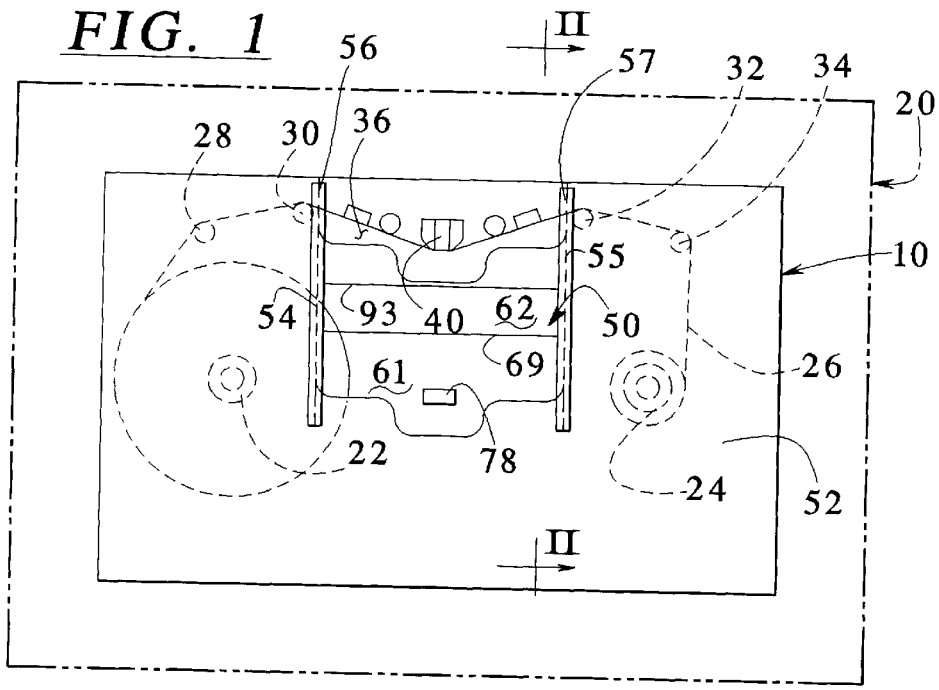
FIG. 1 is a schematic plan view of a tape cartridge incorporating the present invention.

FIG. 1 shows a cartridge 10 mounted within a tape drive 20. The cartridge 10 includes a first reel 22 and a second reel 24 acting as supply reel and take up reel, respectively, in one direction of tape movement, and take up reel and supply reel, respectively, in an opposite direction of movement of the tape. A magnetic tape 26 is wrapped around the reels 22, 24 and spans across the front region of the cartridge. Tape guides 28, 30, 32, 34, are provided within the cartridge 10. An opening 36 is provided at the front side of the cartridge for receiving a magnetic head 40 of the tape drive 20 for guiding the tape across the head 40. A door 50 acting as a dust cover is shown in its open position, positioned on a top cover 52 of the cartridge 10. The door 50 is guided along the top cover 52 by lateral guide tracks 54, 55 on the cartridge 10 and retained by overhangs 56, 57. The overhangs can be inverted L-shaped channels molded with the top cover 52 to form the tracks 54, 55.

Figure 4:
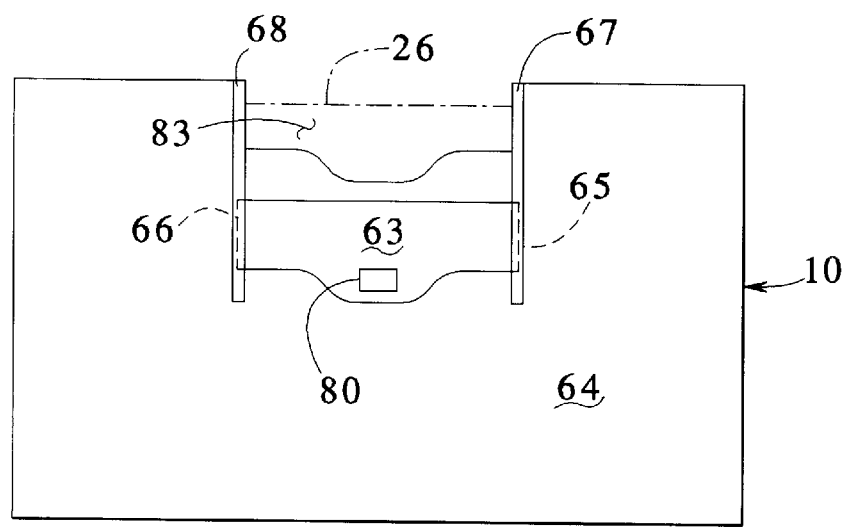
FIG. 4 is a schematic plan view of a tape cartridge incorporating the present invention.

FIGS. 2A–2E show a progression of opening the door 50 of the cartridge 10 as generally shown by the cross-sectional line II—II from FIG. 1. For simplicity, only the cartridge casing, doors and related mechanisms are shown in FIGS. 2A–2E. The door 50 is provided with three panels: a top panel 61, a front panel 62 and a bottom panel 63. The top panel 61 is hinged to the front panel 62 along the line 69. The top panel 61 is spring loaded to the closed position by a spring 61a connected to the overhang 57 (or other stationary part of the cassette 10) and to a lug 61b fixed on the top panel 61. The top panel 61 and the bottom panel 63 are shown guided laterally in the grooves 54, 55 and 65, 66 (shown in FIGS. 1 and 4) and retained by the overhangs 56, 57 and 67, 68. The overhang 57 is shown discontinuously in FIGS. 2A–2E for clarity.

The bottom panel 63 is guided for sliding movement along a bottom cover 64 of the cartridge by lateral guide tracks 65, 66 and retained by L-shaped overhangs 67, 68, molded with the bottom cover 64. The bottom panel 63 is spring loaded to the closed position by a spring 70 connected to the overhang 67, 68 (or other stationary part of the cassette 10) and to a lug 72 fixed on the bottom panel 63. The overhangs 56, 57, 67, 68 need not be continuous but can be discreet tabs or other means to allow a sliding movement of the panels.

The top panel 61 and the bottom panel 63 are pushed from left-to-right in FIG. 2A such as by movement of the cartridge 10 right-to-left in the direction X into the tape drive 20 while stationary members 75, 76 of the tape drive 20 push against tabs 78, 80 of the panels 61, 63. The front panel 62 is thus also pivoted and drawn upwardly. The bottom panel 63 is drawn back by the stationary member 76 to expose a bottom opening 83 so that the magnetic head 40 can be moved in the direction V through the openings 36 and 83 needed to move across a width of the tape 26.

The stationary members 75, 76 can be staggered in the X direction such that the upper panel 61 and the front panel 62 can be started to be opened by the member 75 before the bottom panel 63 is started to be opened by the member 76. Also, the stationary members 75, 76 can be replaced with moving members which move from left to right to translate the panels 61, 63 from left to right to expose the openings 36, 83. Thus, it is relative movement between the members and panels which opens the cartridge.

The front panel 62 includes small cylindrical spindles 62a extending laterally outwardly therefrom and which each engage into parallel arcuate channels 92, each arranged on one lateral side of the panel 62 and which are formed within the cartridge 10. The channels 92 can be formed into internal walls or can be curved rails. The channels 92 are formed substantially underneath the guidetracks 54, 55. Alternatively, one spindle 62a and one channel 92 is possible. The channel 92 defines the relative movement of a lowest edge 93 of the front panel 62. It is noted that in the embodiment of FIGS. 2A–2E, the channel 92 is within the overall length L of the cartridge 10, i.e., the opening movement of the door 50 requires no further space than that occupied by the cartridge 10. A dashed line 94 designates an internal clearance required for movement of the door.

Figure 3:
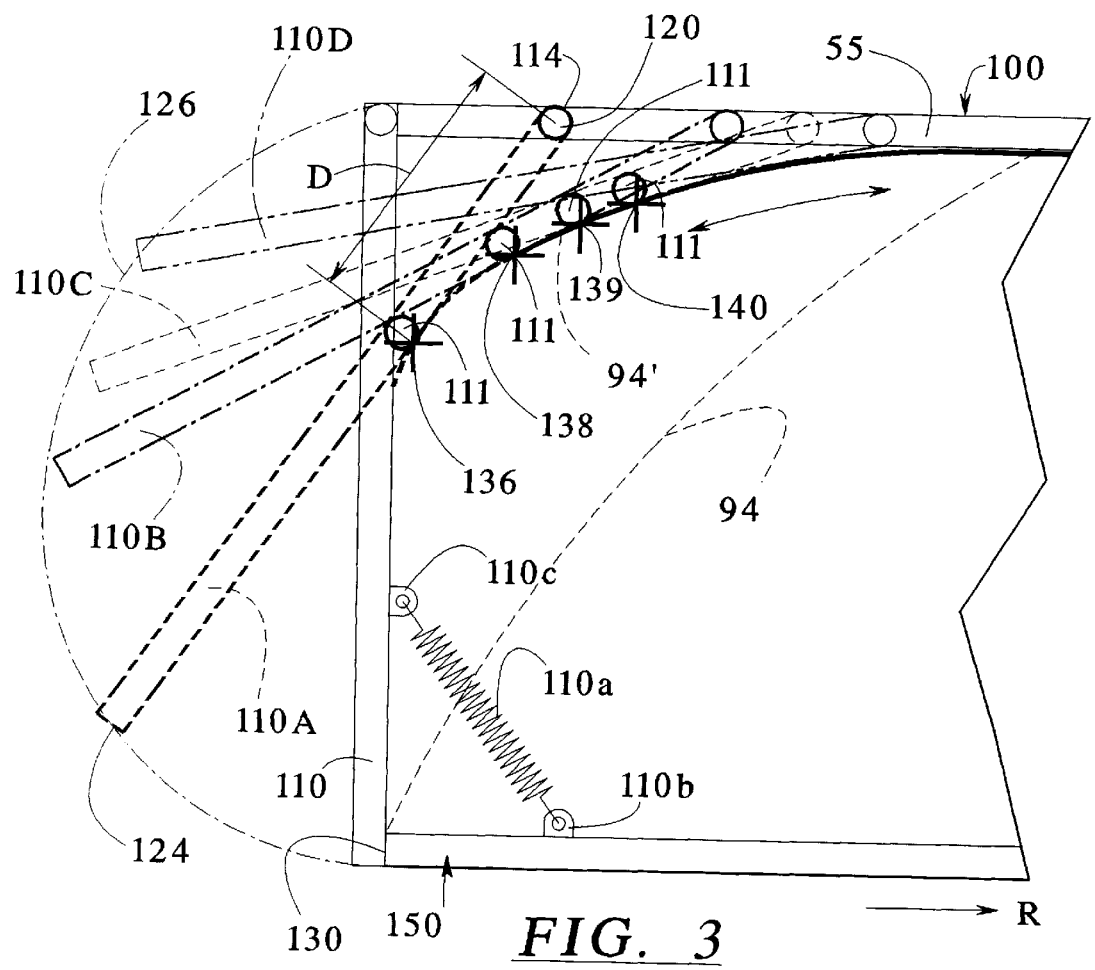
FIG. 3 is a partial schematic sectional view taken generally along line II—II of FIG. 1 but showing an alternate embodiment cartridge door.
Figure 2E:
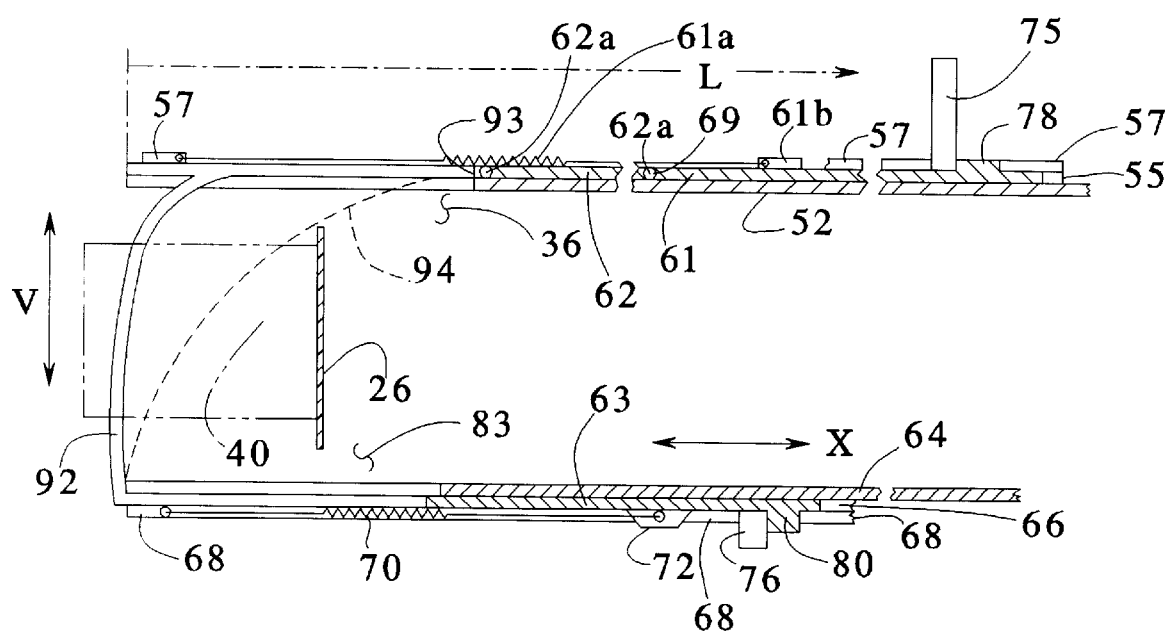

FIG. 3 shows an alternate cartridge 100 which provides for increased room inside the cartridge 100 by elevating a guiding edge 94' compared to the line 94 shown in FIGS. 2A–2E. The guiding edge 94' can be formed as an internal wall or walls or a curved rail or rails. The edge 94' is formed substantially underneath one or both of the grooves 54, 55. In this embodiment, a door 110 is provided which is of a one piece construction and is guided about a transverse line 114 by spindles or axles 120 journaled in lateral guide grooves 54, 55. Means (not shown) such as tabs, or a continuous overhang, overlie the guide grooves 54, 55 to retain the axles 120 therein. The door 110 can slide directly on the edge(s) 94' or can include one or more spindles 111 which slide on the guiding edge(s) 94'. The spindles 111 can extend outwardly from opposite sides of the door if two edges 94' are formed under the grooves 54, 55. A bottom edge 124 of the door 110 moves along the arcuate path 126 during opening and closing of the door 110 which protrudes forwardly of a front edge 130 of the cartridge 100. The door is shown in five positions 110 and 110A–D. Therefore, according to this design, some door opening space must be provided in the tape drive 20 forward of the edge 130 for opening the door 110. However, as comparatively shown by the line 94' compared to the line 94 (shown dashed), less interior room within the cartridge 100 need be allocated for door opening movement.

The door 110 may be spring loaded closed by, for example, a spring 110a that may be connected between a cartridge lug 110b and a door lug 110c.

Additionally, the guiding surface 94' is provided particularly arranged such that a distance D between the axle 120 and the point of contact between the door 110 and the guiding edge(s) 94' remains constant. Therefore, for example, the points 136, 138, 139 and 140 on the edge(s) 94' where the door spindles 111 make contact with the edge(s) are located at the distance D from the axle 120, equivalently. This reduces the load on the hinge and provides for smooth opening of the door.

A bottom door 150 can be provided which slides backwardly in the direction R to open the bottom of the cartridge 100 for vertical movement of a magnetic head within the cartridge as shown, for example, in FIGS. 2A–2E.

Although the present invention has been described with reference to a specific embodiment, those of ordinary skill in the art will recognize that changes may be made thereto without departing from the scope and spirit of the invention as set forth in the appended claims.

I claim:

1. A cartridge for a magnetic recording medium, comprising:
    a cartridge housing having a magnetic recording medium inside, a front opening at a front thereof for access to the magnetic recording medium, and a top wall and a bottom wall adjacent said front opening;
    a door slidably mounted to said housing and arranged to cover said front opening of said cartridge housing in a vertical closed position and slidable to a horizontal open position substantially planar with said at least one of said top wall and bottom wall to clear said opening, and during opening and closing the door being dimensioned, mounted and positioned to never protrude above a horizontal plane defined by and containing the top wall and never protrude below a horizontal plane defined by and containing the bottom wall; and
    a top panel and a bottom panel each positioned to cover a top opening and bottom opening in said cartridge housing, respectively, and slidable rearwardly to expose said top opening and bottom opening, respectively, one of said top panel and said bottom panel being hingedly connected to said door.

2. A cartridge for a magnetic recording medium, comprising:
    a cartridge housing having a magnetic recording medium inside, a front opening at a front thereof for access to the magnetic recording medium, and a top wall and a bottom wall adjacent said front opening;
    a door slidably mounted to said housing and arranged to cover said front opening of said cartridge housing in a vertical closed position and slidable to a horizontal open position substantially planar with said at least one of said top wall and bottom wall to clear said opening, and during opening and closing the door being dimensioned, mounted and positioned to never protrude above a horizontal plane defined by and containing the top wall and never protrude below a horizontal plane defined by and containing the bottom wall; and
    a bottom panel covering a bottom opening of said cartridge housing, said bottom panel being slidable to uncover said bottom opening and said door being slidable to open a top opening of said cartridge housing.

3. A cartridge for a magnetic recording medium, comprising:
    a cartridge housing having a magnetic recording medium inside, a front opening at a front thereof for access to the magnetic recording medium, and a top wall and a bottom wall adjacent said front opening;
    a door slidably mounted to said housing and arranged to cover said front opening of said cartridge housing in a vertical closed position and slidable to a horizontal open position substantially planar with said at least one of said top wall and bottom wall to clear said opening, and during opening and closing the door being dimensioned, mounted and positioned to never protrude above a horizontal plane defined by and containing the top wall and never protrude below a horizontal plane defined by and containing the bottom wall;
    said top wall and said bottom wall of a top opening and a bottom opening respectively contiguous to said front opening;
    a top panel slidably mounted to said top wall, said top panel being slidable from a closed position over said top opening to a retracted position exposing said top opening, a bottom panel slidable from a closed position covering said bottom opening to a retracted position exposing said bottom opening; and
    one of said top and bottom panels hingedly attached to said door which is slidable on said top wall to expose said top opening.

4. A tape cartridge, comprising:
    at least one reel therein holding a supply of magnetic tape and having a front access opening closed by a dust cover door for applying a magnetic head of a tape drive to a length of said magnetic tape, the access opening having above and below a top cover and a bottom cover of said cartridge;
    a guide for guiding said dust cover door for sliding and pivoting movement from its vertical closed position to a horizontally arranged open position substantially planar with said top cover of said cartridge;
    said door being dimensioned, mounted and positioned by said guide to never protrude above the top cover of said cartridge and never protrude below the bottom cover of said cartridge; and
    said dust cover door comprising a first panel and a second panel with a hinge connection therebetween, said second panel arranged above said first panel when said door is in said closed position, said second panel being arranged horizontally and said first panel being arranged vertically at a front of said tape cartridge when the door is closed, and said guide comprises a bottom of said first panel guided within an arcuate channel for sliding movement from a bottom front of said cartridge upwardly and also toward a back of said cartridge for exposing said front access opening, horizontal sliding of said second panel causing pivoting and sliding of said first panel along said arcuate channel.

5. A cartridge for a magnetic recording medium, comprising:
    a cartridge housing having a magnetic recording medium inside, a front opening at a front thereof for access to the magnetic recording medium, and a top wall and a bottom wall adjacent said front opening;
    a door slidably mounted to said housing and arranged to cover said front opening of said cartridge housing in a vertical closed position and slidable along an arcuate guiding surface to a horizontal open position substantially planar with said at least one of said top wall and bottom wall to clear said opening, and during opening and closing, the door being dimensioned, mounted and positioned to never protrude above a horizontal plane defined by and containing the top wall and never protrude below a horizontal plane defined by and containing the bottom wall; and the door, by being slidable along said arcuate guiding surface and by being slidable along an additional guiding surface substantially planar with said top wall and bottom wall, being slidable in a direction away from the front opening so that the door is completely retracted inside of said cartridge in said horizontal open position so that no part of the door extends outside of said front opening.

6. The cartridge according to claim 5 wherein said arcuate guiding surface guides said door with the door both pivoting and sliding along said arcuate guiding surface from said vertical closed position to said horizontal open position.

7. The cartridge according to claim 6 wherein said arcuate guiding surface comprise two guide channels.

8. The cartridge according to claim 5 further comprising a top panel having an articulated connection to said door to allow relative pivoting between said top panel and said door, and wherein said top panel is slidable horizontally.

9. The cartridge according to claim 5 wherein said door comprises a single panel only having a top portion guided for sliding and pivoting along said arcuate guiding surface from the front of said cartridge housing toward a back of said cartridge housing.

10. A tape cartridge, comprising:
at least one reel therein holding a supply of magnetic tape and having a front access opening closed by a dust cover door for applying a magnetic head of a tape drive to a length of said magnetic tape, the access opening having above and below a top cover and a bottom cover of said cartridge;
an arcuate guiding surface for connecting and guiding said dust cover door toward said top cover of said cartridge and for permitting sliding and pivoting movement of the dust cover door from its vertical closed position to a horizontally arranged open position substantially planar with said top cover of said cartridge;
said door being dimensioned, mounted and positioned by said arcuate guiding surface to never protrude above a horizontal plane defined by and containing the top cover and never protrude below a horizontal plane defined by and containing the bottom cover of said cartridge; and
said arcuate guiding surface connecting to a straight guiding surface for allowing a complete retraction of said door entirely within said cartridge in a retracted position of said door.

11. The tape cartridge according to claim 10 further comprising a bottom panel mounted to slide on said bottom cover of said cartridge to uncover a bottom opening which is contiguous with said front access opening, wherein said cartridge has a top opening in said top cover contiguous with said front access opening and said dust cover door has a top panel hingedly connected to said cover door, said top panel and cover door mounted to slide on top of said cartridge to said retracted position to expose said top opening.

12. A tape cartridge, comprising:
a least one reel therein holding the supply of magnetic tape and having a front access opening closed by a dust cover door for applying a magnetic head of a tape drive to a length of said magnetic tape, the access opening having above and below a top cover and a bottom cover of said cartridge;
a guide for guiding said dust cover door for sliding and pivoting movement from its vertical closed position to a horizontally arranged open position substantially planar with said top cover of said cartridge;
said door being dimensioned, mounted and positioned by said guide to never protrude above the top cover of said cartridge and never protrude below the bottom cover of said cartridge; and
a bottom panel mounted to slide on said bottom cover of said cartridge to uncover a bottom opening which is contiguous with said front access opening wherein said cartridge has a top opening in said top cover contiguous with said front access opening and said dust cover door has a top panel hingedly connected to said dust cover door, said top panel and dust cover door mounted to slide on a top of said cartridge to a retracted position to expose said top opening.

* * * * *